United States Patent
Tamas et al.

(10) Patent No.: US 8,065,866 B2
(45) Date of Patent: Nov. 29, 2011

(54) LAWN MOWER PIVOTABLE MULCHING FLAP

(75) Inventors: Dominic Tamas, Northbridge (AU); Patrick Anthony Doyle, Moorebank (AU); Daniel Paul Seidel, Minto Heights (AU)

(73) Assignee: Victa Lawncare Pty Ltd., New South Wales (AU)

( * ) Notice: Subject to any disclaimer, the term of this patent is extended or adjusted under 35 U.S.C. 154(b) by 0 days.

(21) Appl. No.: 12/812,093

(22) PCT Filed: Nov. 26, 2008

(86) PCT No.: PCT/AU2008/001745
§ 371 (c)(1),
(2), (4) Date: Oct. 4, 2010

(87) PCT Pub. No.: WO2009/086581
PCT Pub. Date: Jul. 16, 2009

(65) Prior Publication Data
US 2011/0011047 A1    Jan. 20, 2011

(30) Foreign Application Priority Data

Jan. 9, 2008  (AU) ................................ 2008900090

(51) Int. Cl.
*A01D 43/00* (2006.01)
*A01D 43/06* (2006.01)
(52) U.S. Cl. ......................................... 56/202; 56/320.2
(58) Field of Classification Search ............... 56/202, 56/320.2, 295, 255
See application file for complete search history.

(56) References Cited

U.S. PATENT DOCUMENTS

| | | | | |
|---|---|---|---|---|
| 3,085,386 | A | * | 4/1963 | Slemmons .................... 56/13.4 |
| 3,872,656 | A | * | 3/1975 | Dahl ............................... 56/202 |
| 3,949,540 | A | * | 4/1976 | Christopherson et al. ...... 56/202 |
| 4,203,276 | A | * | 5/1980 | Plamper .......................... 56/202 |
| 4,326,370 | A | * | 4/1982 | Thorud ........................... 56/202 |
| 4,637,203 | A | * | 1/1987 | Fedeli ............................. 56/202 |
| 4,726,177 | A | * | 2/1988 | McGoughy ..................... 56/202 |
| 4,800,712 | A | | 1/1989 | Morse et al. |
| 5,033,260 | A | * | 7/1991 | Jerry ............................. 56/320.2 |
| 5,179,823 | A | * | 1/1993 | Pace ............................... 56/16.9 |
| 5,189,870 | A | * | 3/1993 | Hohnl .......................... 56/320.2 |
| 5,355,666 | A | * | 10/1994 | McDonner et al. ............. 56/255 |
| 5,410,867 | A | * | 5/1995 | Plamper et al. .............. 56/320.2 |
| 5,442,902 | A | | 8/1995 | Mosley et al. |
| 5,826,417 | A | * | 10/1998 | Evans .......................... 56/320.2 |
| 6,085,508 | A | * | 7/2000 | Miatt et al. ..................... 56/17.1 |

(Continued)

OTHER PUBLICATIONS

International Search Report, Australian Patent Office, Dec. 23, 2008.

*Primary Examiner* — Arpad Fabian-Kovacs
(74) *Attorney, Agent, or Firm* — Wood, Herron & Evans, LLP

(57) ABSTRACT

A lawn mower includes a base, a motor that drives a cutting assembly, and a catcher removably coupled to the base. Grass is cut by the blades of the cutting assembly, with the grass being propelled along a channel extending angularly beneath the base of the lawn mower. An exit channel portion delivers the cut grass to a rear opening that communicates with the catcher. A pivotally mounted flap opens and closes the exit channel portion to switch the lawn mower between a catching operational mode and a mulching operational mode.

11 Claims, 5 Drawing Sheets

U.S. PATENT DOCUMENTS

| | | | |
|---|---|---|---|
| 6,195,969 B1 * | 3/2001 | Yilmaz | 56/14.7 |
| 6,490,851 B2 * | 12/2002 | Kutsukake | 56/320.1 |
| 6,694,716 B1 * | 2/2004 | Osborne | 56/202 |
| 6,751,937 B2 | 6/2004 | Kobayashi et al. | |
| 6,862,875 B2 * | 3/2005 | Iida et al. | 56/320.2 |
| 6,910,324 B2 | 6/2005 | Kakuk | |
| 6,966,169 B2 * | 11/2005 | Osborne | 56/202 |
| 6,971,224 B1 * | 12/2005 | Hancock | 56/320.2 |
| 7,249,450 B2 | 7/2007 | Iida et al. | |
| 7,367,174 B2 * | 5/2008 | Grimwade | 56/320.2 |
| 7,448,195 B2 * | 11/2008 | Kohler | 56/320.2 |
| 7,594,379 B2 * | 9/2009 | Nicholson et al. | 56/320.2 |
| 7,624,562 B2 * | 12/2009 | Kallevig et al. | 56/320.2 |
| 7,775,027 B2 * | 8/2010 | Wang et al. | 56/320.2 |
| 7,797,917 B1 * | 9/2010 | Pendleton | 56/320.2 |
| 2003/0217542 A1 | 11/2003 | Osborne | |
| 2004/0083702 A1 * | 5/2004 | Strange et al. | 56/320.2 |
| 2004/0112031 A1 * | 6/2004 | Dickey | 56/320.2 |
| 2004/0168424 A1 * | 9/2004 | Baumann et al. | 56/320.1 |
| 2008/0000211 A1 * | 1/2008 | Hafendorfer et al. | 56/320.2 |
| 2008/0092509 A1 * | 4/2008 | Imanishi et al. | 56/320.2 |
| 2008/0250768 A1 * | 10/2008 | Butler et al. | 56/320.2 |
| 2009/0260339 A1 * | 10/2009 | Uemura et al. | 56/202 |

* cited by examiner

LAWN MOWER PIVOTABLE MULCHING FLAP

This application claims priority to PCT/AU2008/001745 filed Nov. 26, 2008, which claims priority to Australian Patent Application No. AU 2008900090 filed Jan. 9, 2008.

TECHNICAL FIELD

The present invention relates to lawn mowers and more particularly to lawn mowers that provide a mulching function.

BACKGROUND OF THE INVENTION

Lawn mowers, including push and self propelled lawn mowers, have a base upon which there is mounted a motor. The motor may be an internal combustion engine or an electric motor. The motor drives a cutting assembly that includes a plate (disc) to which there is attached a plurality of blades. The plate is rotatably driven about a generally upright axis, with the blade being pivotally attached to the plate for angular movement about axes generally parallel to the upright axis. The blades as they are rotated about the generally upright axis engage grass to cut the grass. The grass is propelled angularly beneath the base along a channel in the base. Mulching mowers cause circulation of the cut grass around the channel to cause the grass to engage the blades a number of times to mulch the cut grass. The cut grass is then urged down into the freshly mown lawn.

In contrast to the above, frequently mowers are merely equipped with a catcher that collects the cut grass, with the cut grass then disposed of.

More recently mowers have been equipped with means via which they are able to operate in a "catching" mode or a "mulching" mode. The lawn mowers being changed in respect of mode by insertion or the removal of a "plug" that closes off the passage leading to the catcher. The "plug" completes a portion of the base that provides a channel along which the cut grass is circulated to be mulched. This type of mower has the disadvantage that the mower cannot be operating at the time the "plug" is inserted or removed. Accordingly, the mower cannot be changed between the two modes of operation while the mower is operative.

Also known are mowers having the two mentioned modes of operation, in which there is a plate that is selectively movable to provide for the delivery of grass to the catcher. The plate is also positionable to cause the mower to operate in a "mulching" mode.

Examples of the above mowers are described in Australian Patent Specifications 2003203292 and 2003203338. In both these instances it is difficult to change the mode of operation of the mower while the mower is still operative.

OBJECT OF THE INVENTION

It is the object of the present invention to overcome or substantially ameliorate the above disadvantage.

SUMMARY OF THE INVENTION

There is disclosed herein a lawn mower including:
a base providing a guide channel for cut grass;
a motor mounted on the base;
a cutting assembly rotatably driven by the motor about a generally upright axis, the assembly being driven to cut grass and to cause the grass to circulate angularly about said axis along said channel;
a catcher to receive the cut grass from said channel; and
a flap pivotably mounted for angular movement, about a pivot axis generally normal to said upright axis between a first position and a second position relative to said channel, said flap in said first position permitting cut grass to exit said channel for delivery to said catcher, while in said second position directing the cut grass to continue along said channel.

Preferably, said flap is resiliently urged to said first position or said second position.

Preferably, said flap is resiliently urged to said second position.

Preferably, said lawn mower further includes a handle extending upwardly and rearwardly from said base that is gripped by a user to aid in directing movement of the lawn mower over a lawn surface, and a user manipulated member movably mounted on the handle and used by the operator to move the flap.

Preferably, said user manipulated member is a lever pivotally mounted on said handle, and said lawn mower further includes a cable extending between said lever and said flap so that movement of said lever results in movement of said flap.

In an alternative preferred form, said user manipulated member is a slidably movable actuator, and said lawn mower further includes a housing within which said actuator is slidably moved.

Preferably, said actuator is longitudinally slidably movable within said housing and is angularly movable to locate said actuator in a selected position locating said flap in a desired position.

Preferably, said lawn mower has a pair of rear wheels that are rotatable about a wheel axis, with said pivot axis being generally parallel to said wheel axis.

Preferably, said flap is adjustably movable between the first and second positions.

BRIEF DESCRIPTION OF THE DRAWINGS

A preferred form of the present invention will now be described by way of example with reference to the accompanying drawings wherein.

DETAILED DESCRIPTION OF THE PREFERRED EMBODIMENT

Figure 1:
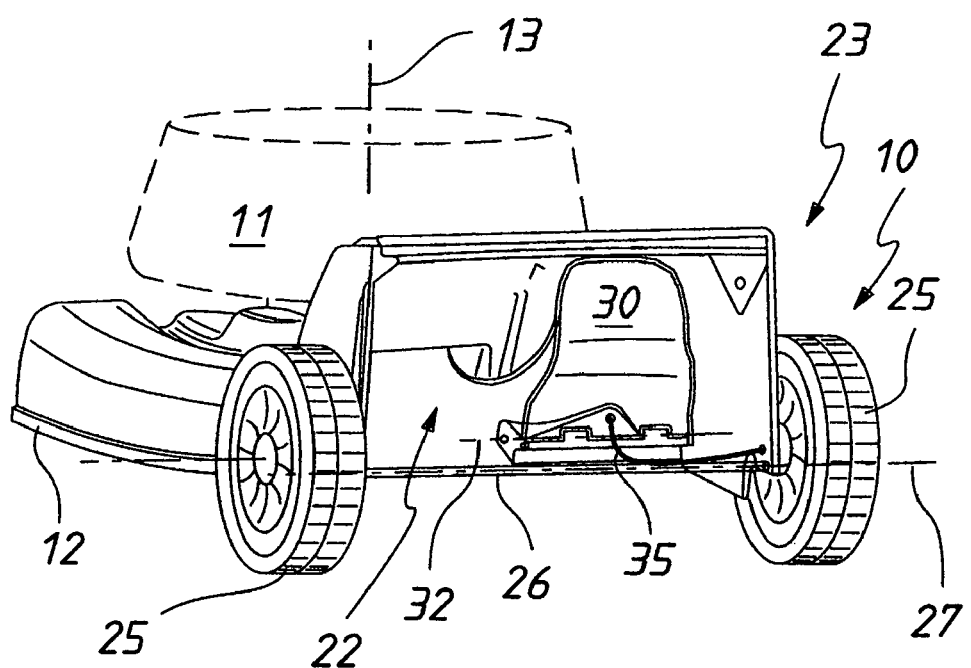
FIG. 1 is a schematic rear perspective view of a lawn mower.
Figure 2:
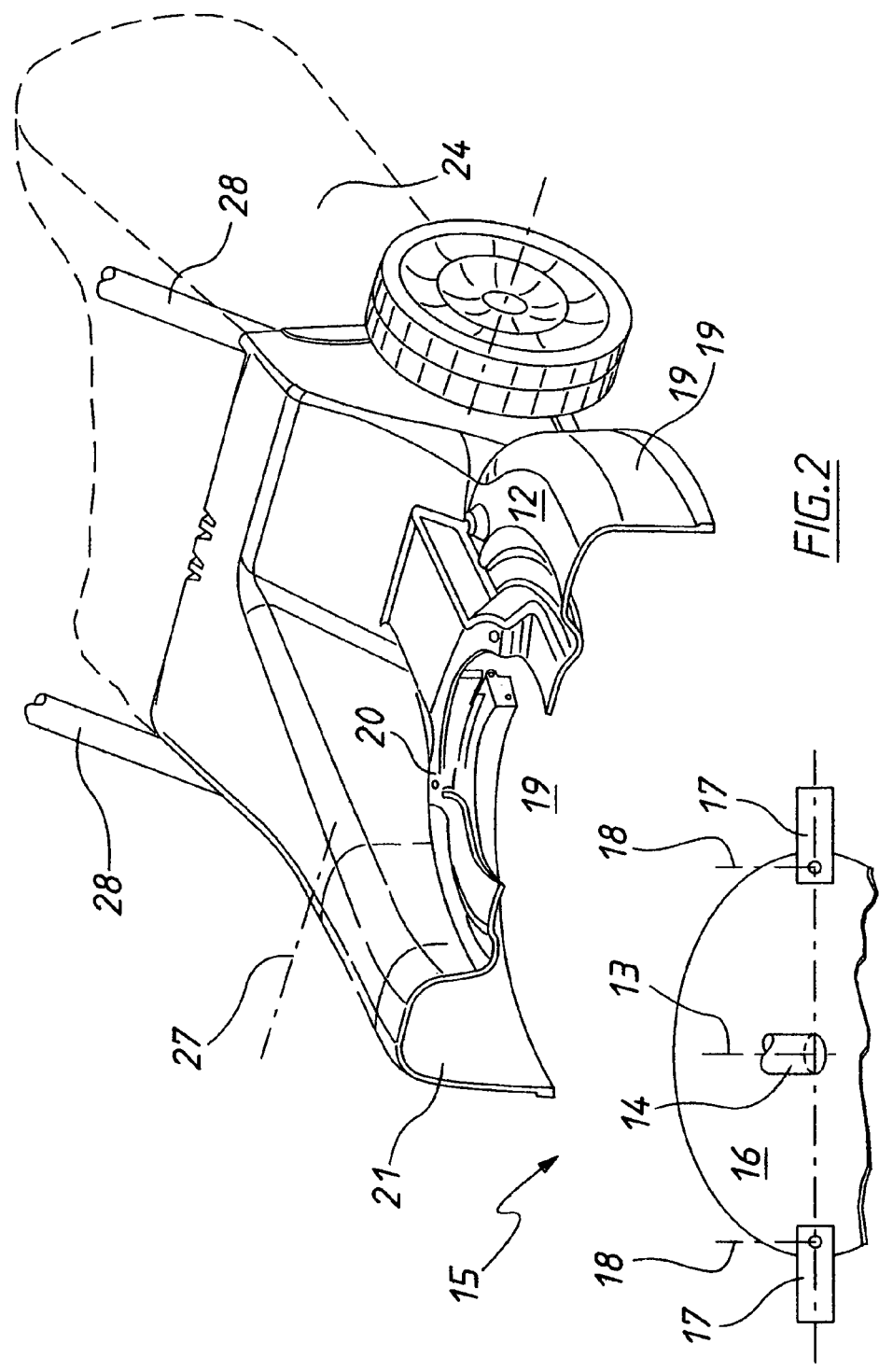
FIG. 2 is a front schematic perspective view of the lawn mower of FIG. 1.

In the accompanying drawings there is schematically depicted a lawn mower 10. The lawn mower 10 has a motor 11. In this embodiment the motor 11 is an internal combustion engine. However it should be appreciated that other motors may be employed, including electric motors.

The lawn mower 10 of the accompanying drawings is a "push" mower. However in the present instance the mower 10 may also be a self propelled mower.

The mower 10 includes a base 12 upon which the motor 11 is mounted, with the motor 11 having a generally upright central rotational axis 13. The motor 11 includes an output drive shaft 14 also having as its axis the rotational axis 13.

Attached the shaft 14 is a cutting assembly 15 that includes a disc 16 fixed to the shaft 14 so as to rotate therewith about the axis 13. The disc 16 extends radially outward from the shaft 14 and has at least two blades 17 that engage the grass to cut the grass. The blades 17 are pivotally attached to the discs 16 for angular movement about axes 18 that are upright so as to be generally parallel to the axis 13.

The base 12 has a central aperture 19 through which the shaft 14 projects. Surrounding the aperture 19 are mountings 20 to which the motor 11 is attached. The base 12 also has a channel 21 extending angularly about the axis 13 to which cut grass is delivered by the blades 17. Preferably the channel 21 follows a circular path. The blades 17 cause the cut grass to move angularly about the axis 13, as well as downward into the cut grass when operating in a "mulch" mode. The channel 21 has an exit channel portion 22 that extends rearwardly towards the rear opening 23 of the base 12.

Attached to the base 12 so as to extend from the rear opening 23 is a removable catcher 24. The catcher 24 has a front opening aligned with the channel portion 22 so as to receive cut grass therefrom.

The base 12 is supported on four wheels including two rear wheels 25 that may be driven in the instance where the mower 10 is self propelled. The wheels 25 are supported by a transverse rear axel 26 providing the wheels 25 with a rotational axis 27.

Attached to an extending upwardly from the base 12 is a handle 28 that is gripped by a user at the upper end thereof to direct and/or propel the lawn mower 10.

The base 12 has a radially outer skirt 29 that at least partly defines the channel 21.

Attached to and supported by the base 12 is a flap 30. The flap 30 is mounted on a transverse shaft 31 that provides a pivot axis 32 for the flap 30. The axis 32 is generally normal to the axis 13 (but displaced therefrom) and is therefore generally horizontal when the mower 10 is positioned on a generally horizontal surface. The flap 30 is operatively associated with the channel portion 22 so as to selectively close the rear opening 23 that provides communication with the interior of the catcher 24. More particularly the flap 30 is movable angularly about the axis 32 between a closed position at which the flap 30 is generally upright at least substantially closing the channel portion 22, and an open position at which the flap 30 is generally horizontally oriented so as to provide for the flow of cut grass to the interior of the catcher 24. However it should be appreciated the flap 30 can also be located in any desired position between the closed and open positions therefore providing for adjustment in respect of the volume of cut grass being delivered to the catcher 24. When closed the channel portion 22 is closed by the flap 30, the cut grass is caused to circulate about the channel 21 thereby causing "mulch" of the grass cuttings. As the flap 30 is moved to the open position at least some of the grass is ejected so as to be delivered to the interior of the catcher 24.

Wound about the shaft 31 is a coil spring 33 that urges the flap 30 to a generally upright position closing the channel portion 22.

Pivotally mounted on the handle 28 is a lever 34 that is pivotable about an axis generally parallel to the axis 27. The lever 34 is manipulated by an operator to cause movement of the flap 30. Attached to and extending from the lever 34 is a cable 35 that extends to the flap 30. By causing pivoting of the lever 34, the flap 30 is moved between the first and second positions thereof, or any desired position therebetween. Preferably the flap 30 is adjustably movable through 90°.

Figure 4:
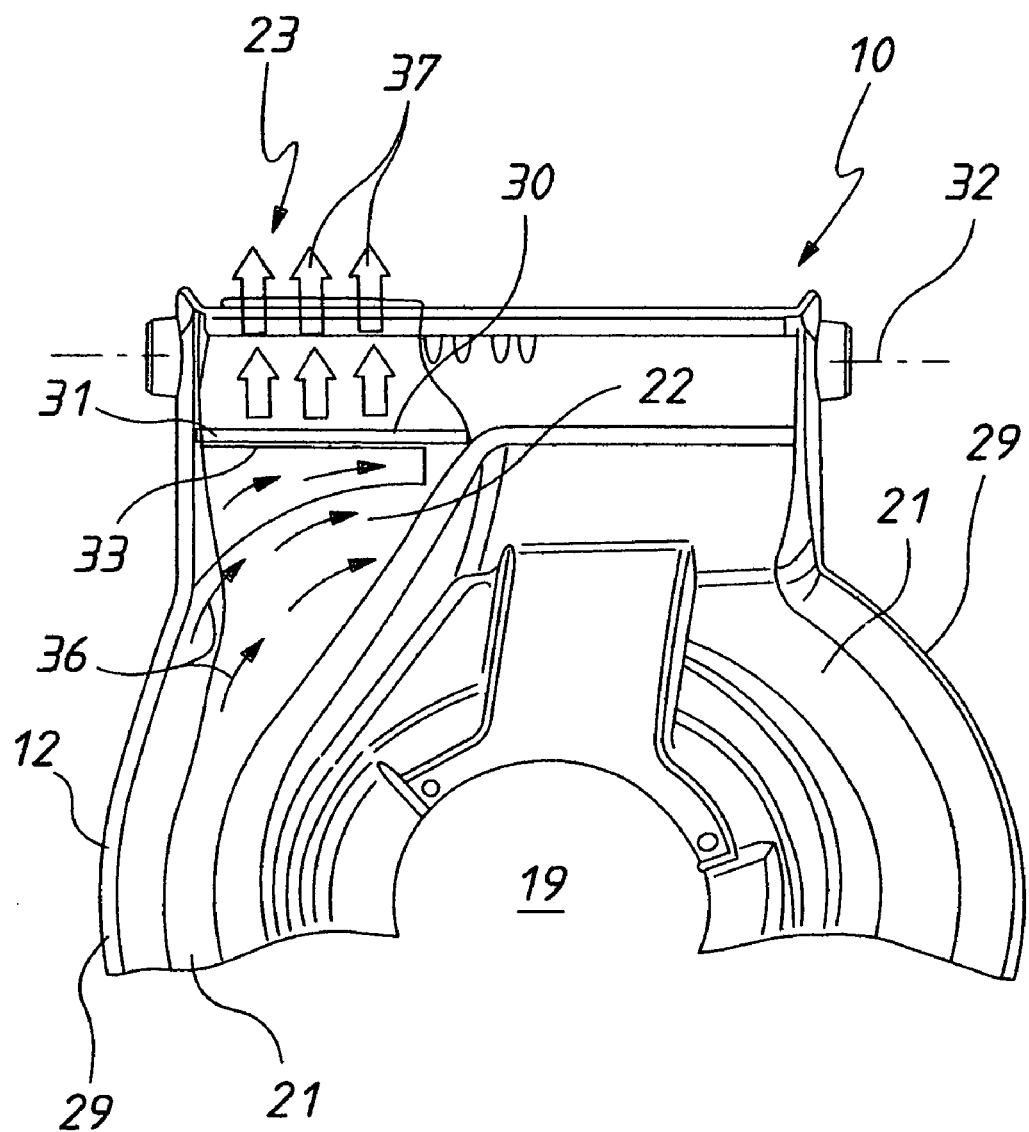
FIG. 4 is a schematic bottom plan view of the lawn mower of FIGS. 1 and 2.

As best seen in FIG. 4, when the flap 30 is closed, the cut grass is caused to circulate about the channel 21 in the direction of the arrows 36. When the flap 30 is opened so as to provide for the delivery of grass to the interior of the catch 24, the grass travels in the direction of the arrows 37.

Figure 3:
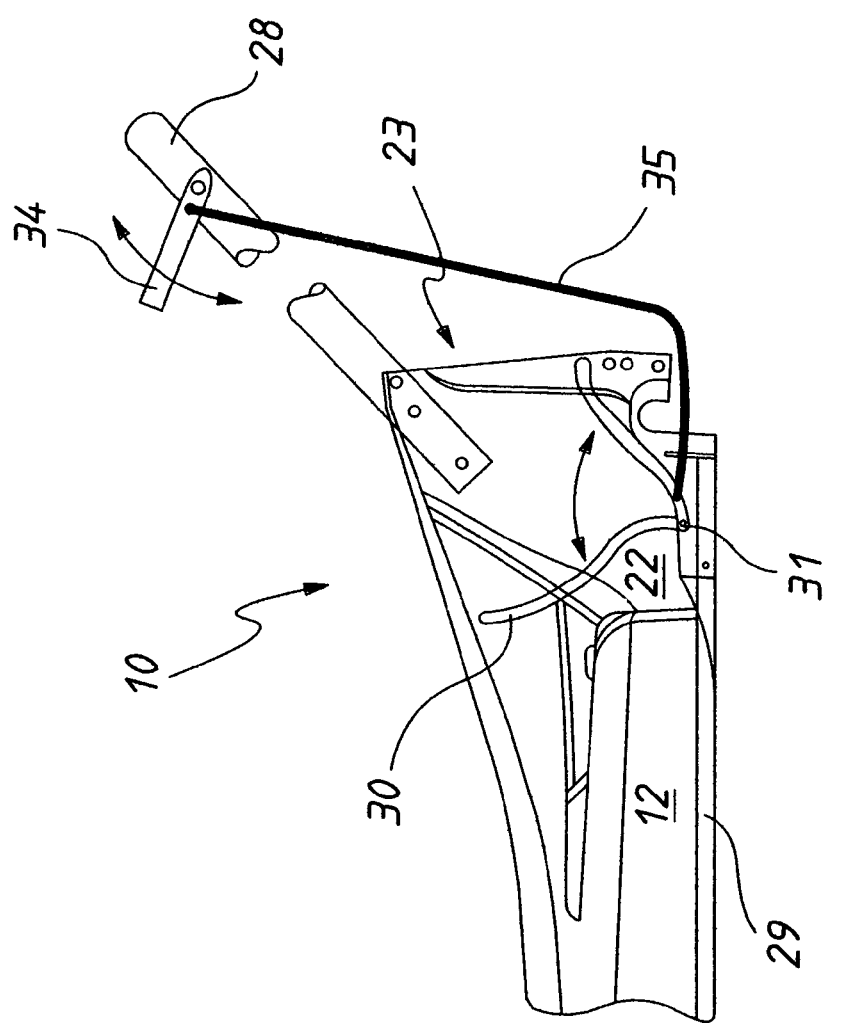
FIG. 3 is a schematic sectioned side elevation of portion of the lawn mower of FIGS. 1 and 2.
Figure 5:
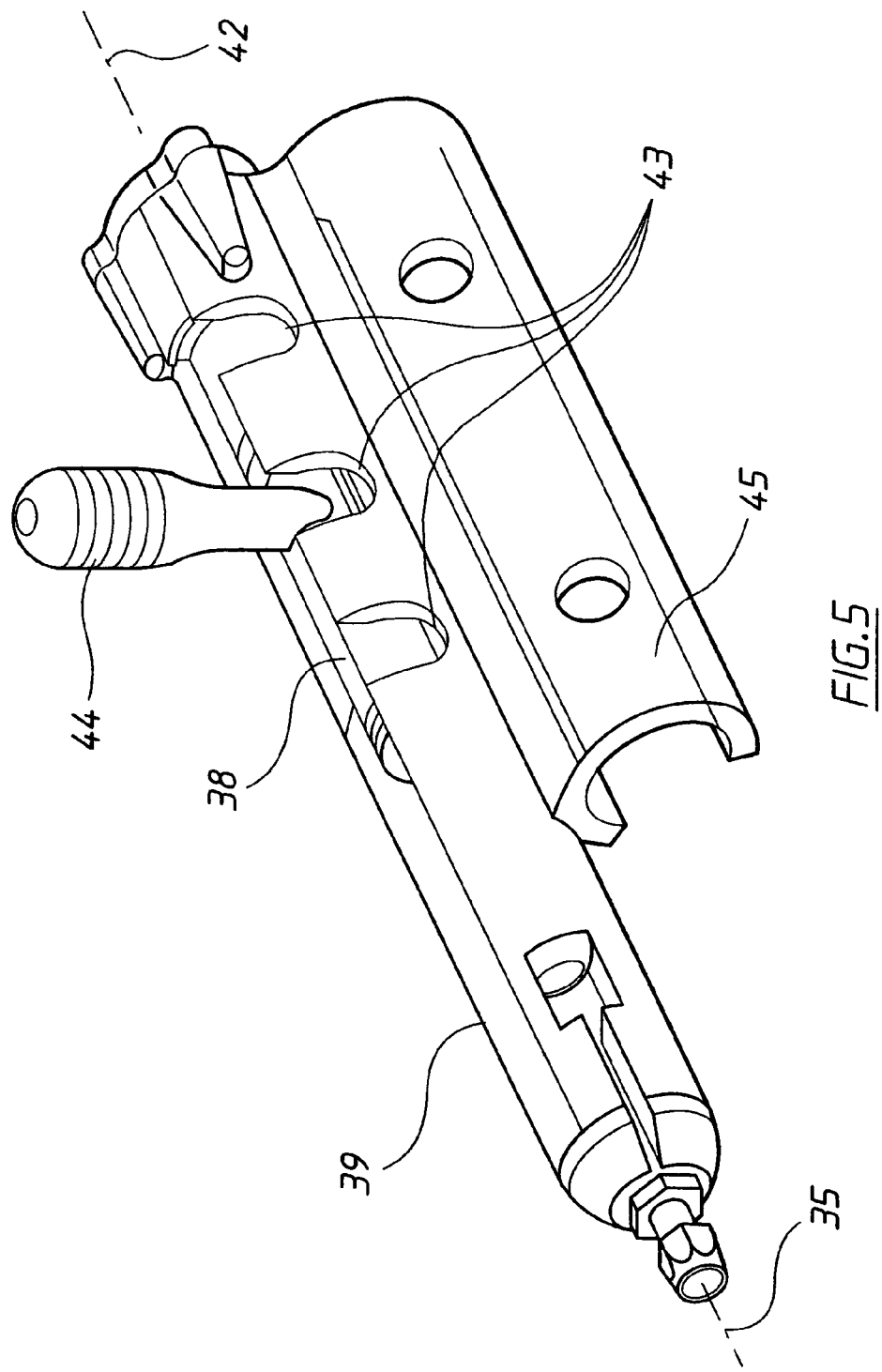
FIG. 5 is a schematic isometric view of an actuator employed in the lawn mower of FIGS. 1 and 2.

In FIG. 5 there is schematically depicted an alternative arrangement to the lever 34 of FIG. 3. In this embodiment a slidably movable actuator 38 is coupled to the inner cable of the cable 35, with the outer sheath thereof attached to the housing 39 within which the actuator 38 is slidably captively located. The outer sheath of the cable 35 is attached to a connector 40 mounted on the housing 39.

The housing 39 has a longitudinally extending passage 41 within which the actuator 38 is slidably located. The actuator 38 is longitudinally elongated and is slidably movable along the axis 42 extending longitudinally of the housing 39.

The housing 39 has a plurality of "notches" 43 within which the handle 44 of the actuator 38 is locatable, to locate the flap 30 in a desired position.

Fixed to or formed integral with the housing 39 is a mounting bracket 45 that is attached to the handle 28 by fasteners.

The invention claimed is:

1. A lawn mower comprising:
   a base including an annular guide channel for cut grass, said channel including a first channel portion;
   a motor mounted on the base;
   a cutting assembly rotatably driven by the motor about a generally upright axis, the cutting assembly being driven to cut grass and to cause the grass to circulate angularly about said upright axis and along said channel;
   a catcher coupled to the base and configured to receive the cut grass from said channel via said first channel portion; and
   a flap pivotably mounted for angular movement about a pivot axis generally normal to said upright axis between a first lowered position and a second raised position relative to said channel, said flap in said first lowered position permitting cut grass to travel through said first channel portion for delivery to said catcher in a catching operational mode, said flap in said second raised position directing the cut grass to continue along said channel so as to repeatedly engage the cutting assembly in a mulching operational mode.

2. The lawn mower of claim 1, wherein said flap is resiliently biased toward said first lowered position or said second raised position.

3. The lawn mower of claim 2, wherein said flap is resiliently biased toward said second raised position.

4. The lawn mower of claim 1, further comprising a handle extending upwardly and rearwardly from said base that is gripped by a user to aid in directing movement of the lawn mower over a lawn surface, and a user manipulated member movably mounted on the handle and used by the operator to move the flap during movement and operation of the lawn mower.

5. The lawn mower of claim 4, wherein said user manipulated member is a lever pivotally mounted on said handle, and said lawn mower further includes a cable extending between said lever and said flap so that movement of said lever results in movement of said flap.

6. The lawn mower of claim 4, wherein said user manipulated member is a slidably movable actuator, and said lawn mower further includes a housing within which said actuator is slidably moved.

7. The lawn mower of claim 6, wherein said actuator is longitudinally slidably movable within said housing and is angularly movable to locate said actuator in a selected position locating said flap in a desired position.

8. The lawn mower of claim 1, wherein said lawn mower has a pair of rear wheels that are rotatable about a wheel axis, with said pivot axis being generally parallel to said wheel axis.

9. The lawn mower of claim 1, wherein said flap is adjustably movable between the first and second positions.

10. A lawn mower comprising:
- a base including an annular guide channel for cut grass, said channel including a first channel portion;
- a motor mounted on the base;
- a cutting assembly rotatably driven by the motor about a generally upright axis, the cutting assembly being driven to cut grass and to cause the grass to circulate angularly about said upright axis and along said channel;
- a catcher coupled to the base and configured to receive the cut grass from said channel via said first channel portion;
- a flap pivotably mounted for angular movement about a pivot axis generally normal to said upright axis between a first lowered position and a second raised position relative to said channel, said flap in said first lowered position permitting cut grass to travel through said first channel portion for delivery to said catcher in a catching operational mode, said flap in said second raised position directing the cut grass to continue along said channel so as to repeatedly engage the cutting assembly in a mulching operational mode;
- a handle extending upwardly and rearwardly from said base, said handle being gripped by a user to aid in directing movement of the lawn mower over a lawn surface; and
- a user manipulated member coupled to said flap and mounted on said handle, said user manipulated member including a housing with a plurality of notches and a slidably movable actuator mounted within the housing and movable between said plurality of notches, said actuator moved by the operator to move the flap during movement and operation of the lawn mower.

11. The lawn mower of claim 10, wherein said flap is resiliently biased toward said second raised position.

* * * * *